United States Patent
Prock et al.

(10) Patent No.: US 8,942,705 B1
(45) Date of Patent: Jan. 27, 2015

(54) SYSTEMS AND METHODS FOR REDIRECTING A MOBILE STATION VIA A TRAFFIC CHANNEL

(71) Applicant: Sprint Spectrum L.P., Overland Park, KS (US)

(72) Inventors: John W. Prock, Raymore, MO (US); Michael Erich, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 69 days.

(21) Appl. No.: 13/718,318

(22) Filed: Dec. 18, 2012

(51) Int. Cl.
*H04W 36/00* (2009.01)

(52) U.S. Cl.
CPC ................... *H04W 36/00* (2013.01)
USPC ......... 455/436; 455/422.1; 370/328; 370/331

(58) Field of Classification Search
USPC ........ 455/436, 422.1, 438, 439; 370/328, 331
See application file for complete search history.

(56) References Cited

U.S. PATENT DOCUMENTS

| | | | |
|---|---|---|---|
| 6,075,990 A | 6/2000 | Shin | |
| 6,137,783 A | 10/2000 | Sallberg | |
| 6,185,421 B1 | 2/2001 | Alperovich et al. | |
| 6,377,560 B1 | 4/2002 | Dailey | |
| 6,628,953 B1 | 9/2003 | Dillon et al. | |
| 7,076,256 B1 | 7/2006 | Orler et al. | |
| 7,180,879 B2 | 2/2007 | Sinnarajah et al. | |
| 7,333,797 B2 | 2/2008 | Thorson | |
| 7,689,247 B2 | 3/2010 | Dawood et al. | |
| 7,787,421 B2 | 8/2010 | Ramanna et al. | |
| 2003/0035393 A1 | 2/2003 | Sinnarajah et al. | |
| 2003/0119535 A1 | 6/2003 | Needham et al. | |
| 2004/0110511 A1 | 6/2004 | Schmidt et al. | |
| 2006/0068813 A1 | 3/2006 | Ku et al. | |
| 2006/0217118 A1 | 9/2006 | Benco et al. | |
| 2008/0076436 A1 | 3/2008 | Sanders et al. | |
| 2008/0146252 A1 | 6/2008 | Razdan et al. | |

(Continued)

FOREIGN PATENT DOCUMENTS

EP  0 926 844 A2  6/1999

OTHER PUBLICATIONS

Application of Ryan Talley, et al., Method and System of Assigning a Channel Without Paging, U.S. Appl. No. 11/810,665, filed Jun. 6, 2007.

(Continued)

*Primary Examiner* — Chuong A Ngo (57) ABSTRACT

Various embodiments are described for redirecting a mobile station via a traffic channel. In one embodiment, a first RAN receives a request from a mobile station to establish a traffic channel between the mobile station and the first RAN for use in a communication session. The first RAN makes a determination to not establish the communication session, but nevertheless establishes the requested traffic channel after making the determination. Then, without establishing the communication session, the first RAN redirects the mobile station via the established traffic channel to a second RAN. By establishing the traffic channel even though the RAN may be unable (or unwilling) to allow the mobile station to establish the communication session, the RAN is able to control the behavior of the mobile station in the event that the RAN cannot establish the requested communication session.

20 Claims, 7 Drawing Sheets

(56) References Cited

U.S. PATENT DOCUMENTS

2009/0207808 A1* 8/2009 McCann et al. ............. 370/331
2012/0188980 A1* 7/2012 Wang et al. .................. 370/331

OTHER PUBLICATIONS

Application of Sachin R. Vargantwar, et al., Method and System for Wireless Communication Setup with Threshold Distance Between Wireless Communication Device and Base Station, U.S. Appl. No. 13/070,136, filed Mar. 23, 2011.

Office Action from U.S. Appl. No. 11/810,665, dated Oct. 5, 2010.
Office Action from U.S. Appl. No. 11/810,665, dated Feb. 17, 2011.
Office Action from U.S. Appl. No. 11/810,665, dated Aug. 29, 2011.
Notice of Allowance from U.S. Appl. No. 11/810,665, dated Mar. 27, 2012.
Wu, Hsiao-Kuang, et al., Personal Paging Area Design Based on Mobile's Moving Behaviors, INFOCOM vol. 1, pp. 21-30, 2001.
Akyildiz, I.F., et al., Abstract of "Movement-Based Location Update and Selective Paging for PCSNetworks," Networking, IEEE/ACM Transactions, vol. 4, Issue 4, p. 629, Aug. 1996.
Korowajczuk, Leonhard et al., Designing CDMA2000 Systems, John Wiley & Sons, Ltd., 2004.

* cited by examiner

SYSTEMS AND METHODS FOR REDIRECTING A MOBILE STATION VIA A TRAFFIC CHANNEL

BACKGROUND

A typical cellular network may include one or more radio access networks (RANs), each of which may be arranged to provide mobile stations with access to one or more transport networks such as the public switched telephone network (PSTN) and/or the Internet. The RAN may include, for example, a cellular base station (e.g., base transceiver station, access node, eNodeB, or the like), which may include an antenna configuration and associated equipment for radiating to define one or more coverage areas in which a mobile station can wirelessly communicate with the base station over an air interface. The base station may operate according to a defined air-interface protocol such as CDMA, LTE, WiMAX, and/or GSM, and the mobile station may operate according to the same air-interface protocol to enable and facilitate communicating with the base station and gaining access to one or more transport networks via the RAN.

One or more carrier frequencies ("carriers") form the physical transmission interface of an air-interface link between a mobile station and a RAN. Each carrier typically takes the form of a pair of radio frequencies. For example, radio waves of one frequency may be used to transmit forward-link data from the RANs to the mobile stations, while radio waves of another frequency may be used to transmit reverse-link data from the mobile stations to the RANs. Further, a RAN may communicate with multiple mobile devices on any given forward- or reverse-link carrier.

Logical channels of the physical transmission interface may be used to send and/or receive traffic, control, and broadcast data, as examples. Channels take different forms under different types of air-interface protocols. In TDMA (time division multiple access) networks, channels typically take the form of one or more timeslots of a repeating waveform on a carrier frequency used by multiple mobile stations. In other words, in TDMA networks, different mobile stations on different channels take turns using the full transmit power of the base station at different times. In CDMA (code division multiple access) networks by contrast, different mobile stations on different channels simultaneously share the transmit power of the base station. In such networks, different channels are delineated by the RAN applying different codes to different channels.

Base stations in a given RAN may be arranged to broadcast in each of their coverage areas a respective pilot signal (or reference signal), which may enable mobile stations to select an appropriate coverage area in which to operate. The mobile stations may correspondingly scan for these pilot signals and attempt to register in a coverage area that is broadcasting a sufficiently strong signal.

When a mobile station enters into coverage of the RAN, such as coverage of a base station, the mobile station may engage in a registration (e.g., attach) procedure. During this procedure, the mobile station may transmit a registration-request message via a reverse-link control channel (such as an access channel) to the base station providing the coverage area. Upon receiving that registration-request message, the base station may transmit to the mobile station via a forward-link control channel a registration-response message, acknowledging the registration.

After registering with a RAN, a mobile station may operate in an idle mode on a carrier frequency in a coverage area (e.g., a sector) provided by a base station of the RAN. If another network entity such as a telephone, computer, or other communication device attempts to contact the mobile station, then the RAN will typically send the mobile station a page message via a forward-link control channel. The mobile station may respond by requesting establishment of a communication session over a traffic channel and then conducting the relevant communication via the established communication session. In other instances, the mobile station may initiate contact with another network entity, in which case the mobile station sends the RAN an access-request message in order to request establishment of a communication session over a traffic channel and then conducts the relevant communication via the established communication session.

OVERVIEW

When selecting a RAN with which to register, the mobile station may reference a preferred roaming list (PRL), which designates a preferred order of RANs to which the mobile station should attempt to connect. If a mobile station is not already registered with a RAN, the mobile station may select the first (i.e., the most-preferred) RAN to which to connect. The mobile station may then send a registration-request message to that RAN. If the mobile station is unable to send a registration-request message to that RAN (perhaps because the mobile station is not within a coverage area of that RAN), the mobile station may then send a registration-request message to the second-most-preferred RAN.

A RAN may deny a request to establish a communication session (and may send a corresponding session-denied message) if, for example, the RAN lacks available resources to facilitate the communication session. Such resources could take the form of time slots, transmission power, and/or traffic channels, as examples.

If a mobile station receives a session-denied message from a given RAN, the mobile station may then attempt to register with the RAN with which it most recently registered successfully (and without referencing the PRL). While this behavior may be intended, such behavior may be undesirable if, for example, a cellular network operator desires that the mobile station instead seek to register with a second-most-preferred RAN (as designated by the cellular network operator, perhaps by way of the PRL).

Various embodiments are described herein to ameliorate this (and other) mobile-station behavior upon the mobile station being denied a communication session by a given RAN. In one embodiment, a first RAN receives a request from a mobile station to establish a traffic channel between the mobile station and the first RAN for use in a communication session. The first RAN makes a determination to not establish the communication session, but nevertheless establishes the requested traffic channel after making the determination. Then, without establishing the communication session, the first RAN redirects the mobile station via the established traffic channel to a second RAN. By establishing the traffic channel even though the RAN may be unable (or unwilling) to allow the mobile station to establish the communication session, the RAN is able to control the behavior of the mobile station in the event that the RAN cannot establish the requested communication session.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

I. Example Operation

Figure 1:
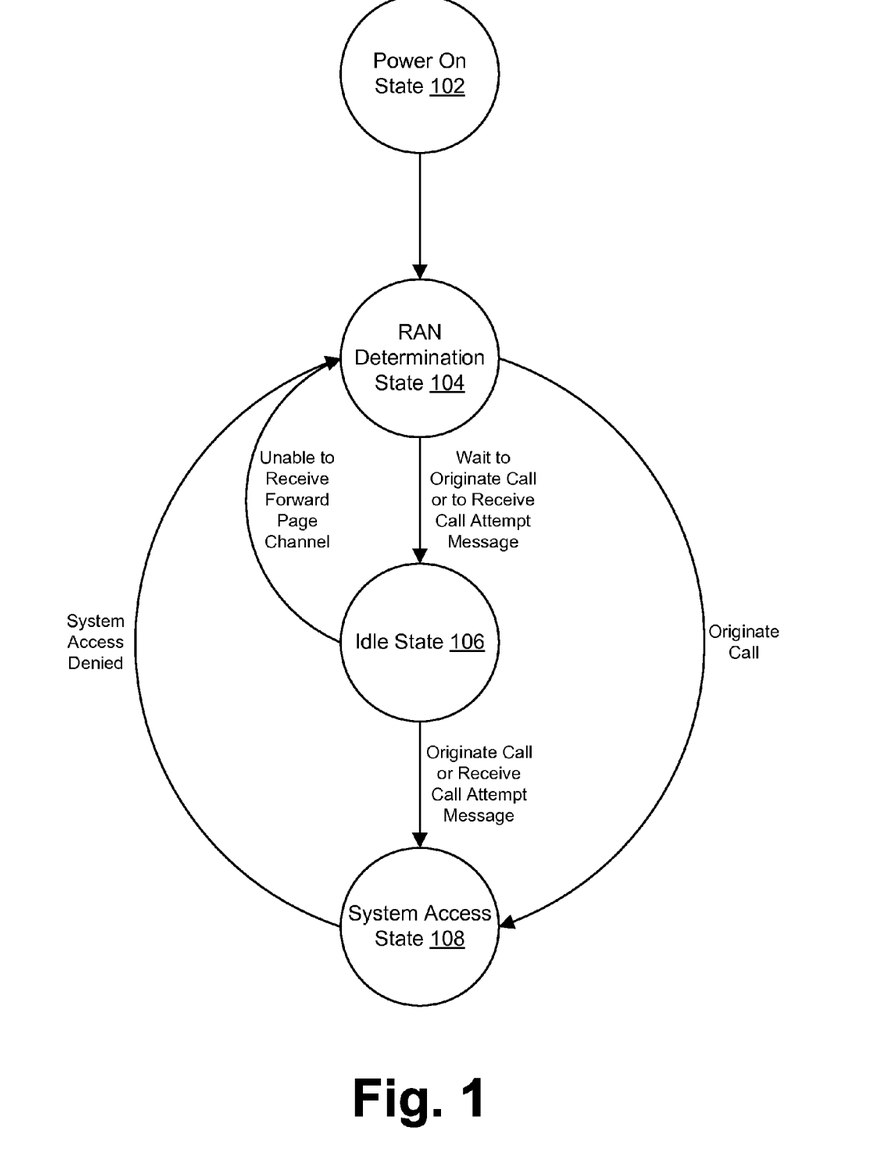
FIG. 1 is a state diagram of an example call process.

FIG. 1 is a state diagram of a call process, in accordance with exemplary embodiments. As shown in FIG. 1, a mobile station initially transitions from Power On state 102 to RAN Determination state 104. During RAN Determination state 104, the mobile station may select a RAN with which to register. The mobile station may determine which RAN to select based on stored network-preference data (such as a PRL) provided to the mobile station (and perhaps updated) by a cellular-network operator, and/or based on pre-programmed logic of the mobile station (to perhaps select a RAN based on strength of a pilot signal), among other possibilities. The mobile station may then register with the selected RAN while still in the RAN Determination state 104.

The mobile station may transition from RAN Determination state 104 to Idle state 106 upon registering with the selected RAN. While in Idle state 106, the mobile station may wait for user instructions to originate a call, or wait for a call-attempt message from the RAN with which the mobile station is registered. The mobile station may also monitor the forward-link paging channel of a given RAN base station while in Idle state 106 so as to determine the strength of the air-interface link. If the strength falls below a given threshold, the mobile station may transition from Idle state 106 back to RAN Determination state 104 in order to select a RAN that can provide a stronger air-interface link.

The mobile station may transition from Idle state 106 to System Access state 108 upon the mobile station attempting to originate a call or upon the mobile station receiving a call-attempt message from the RAN with which the mobile station is registered. (Additionally, the mobile station may transition to System Access state 108 from System Determination state 104 if user instructions indicate that the mobile station is to originate a call upon registering with a RAN.) While in System Access state 108, the mobile station may send a request to establish a traffic channel with the first RAN for use in a communication session for the call. The mobile station may remain in this state upon establishing a traffic channel and during the duration of the call. On the other hand, the mobile station may transition from the System Access state to the System Determination state if the request to establish the traffic channel is denied or if the mobile station is otherwise unable to establish the communication session. The mobile station may transition to the System Determination state upon completion of the call.

Figure 2:
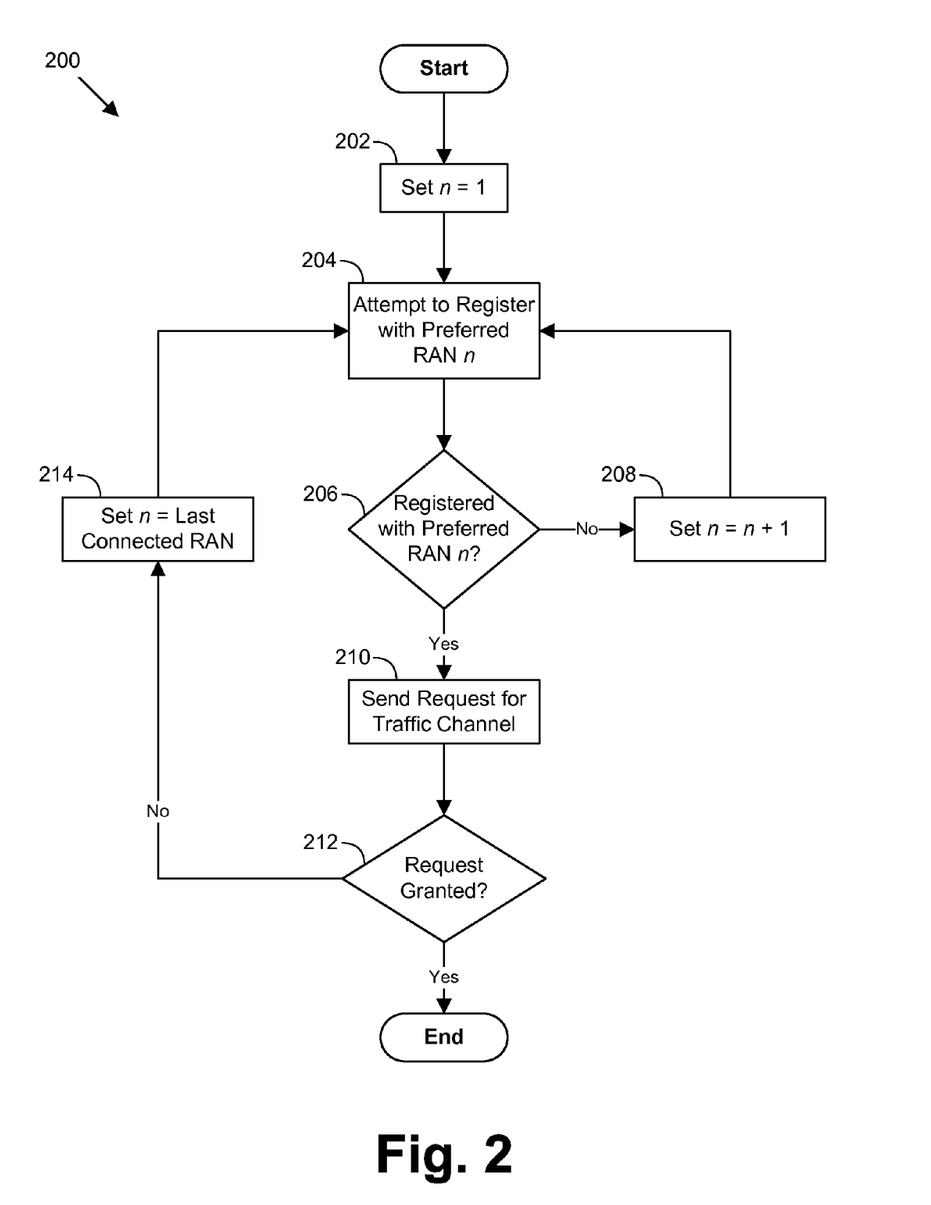
FIG. 2 is a flowchart of an example method carried out by a mobile station.

FIG. 2 is a flowchart of a method of (sometimes) undesirable behavior carried out by a mobile station while in the System Determination and System Access states, in accordance with exemplary embodiments. As shown, method 200 begins at step 202 with a mobile station selecting the first (i.e., the most-preferred or n=1) RAN from a list preferred RANs.

At step 204, the mobile station attempts to register with the selected RAN and, at step 206, determines whether it was able to register with the RAN. If the mobile station was unable to register, then at step 208 it selects the next-most-preferred (i.e., n=n+1) RAN from the list of preferred RANs, and then attempts to register with that RAN at step 204. For example, if the mobile station was unable to register with the most-preferred RAN, then the mobile station might select the second-most-preferred (i.e., n=2) RAN from the list of preferred RANs, and then attempt to register with that second RAN.

If the mobile station was able to register with the selected RAN, then at step 210 the mobile station may send a request to establish a traffic channel between the mobile station and the RAN. At step 212, the mobile station determines whether the RAN granted the request to establish the traffic channel.

The (sometimes) undesired behavior of the mobile station occurs at step 214 upon the RAN denying (i.e., not granting) the request to establish the traffic channel. That is, the mobile station selects at step 214 the RAN with which the mobile station most-recently registered, without referencing stored network-preference data. The mobile station then attempts to register with that RAN at step 204.

Figure 3:
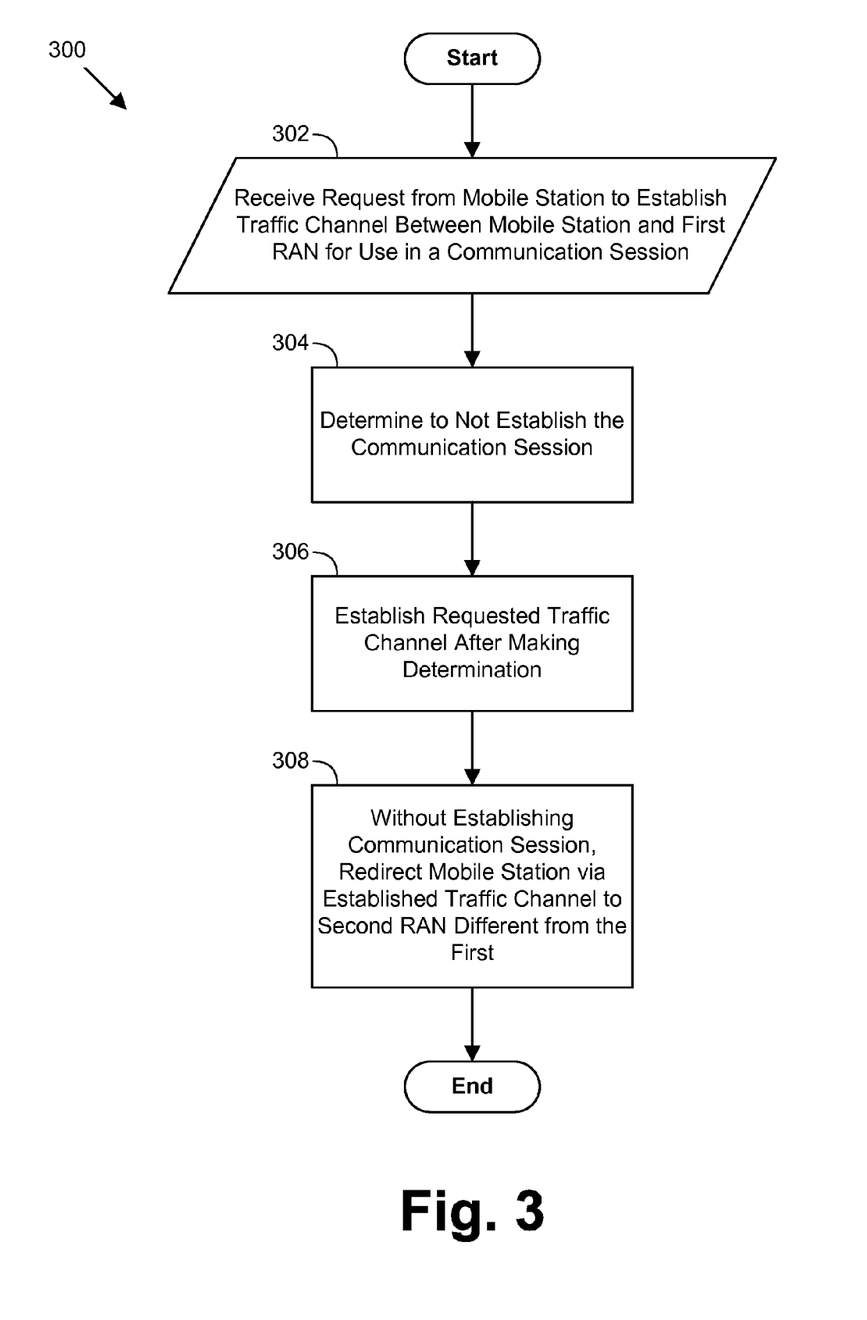
FIG. 3 is a flowchart of an example method carried out by a RAN.

FIG. 3 illustrates a method for redirecting a mobile station, in accordance with exemplary embodiments. While the method is described as being carried out by a first RAN, those having skill in the art will recognize that any other entity (such as a base station or other cellular-network entity), alone or in combination with the first RAN, may perform the method.

As shown in FIG. 3, method 300 begins at step 302 with a first RAN receiving a request from a mobile station to establish a traffic channel between the mobile station and the first RAN for use in a communication session. Then at step 304, the RAN makes a first determination to not establish the communication session.

Making the first determination could involve determining that the communication session would be for communicating data of a given class. Generally, data can be categorized based on its sensitivity to delayed delivery and to data loss. Real-time data is generally more sensitive to delay because of the need to preserve the time relation between parts of the communication stream. Examples of real-time data include voice communication and streaming video. Best-effort data is generally more sensitive to data loss, and because the communication session may guarantee transmission of all data (perhaps by retransmission of corrupted data), this data must typically be less sensitive to delay. Examples of best-effort data include web pages and text messages, where data loss (such as missing letters or words) would be unacceptable to the mobile-station user. Those having skill in the art will recognize that data may be categorized into other classes (or combinations of classes) without departing from the scope of the claims.

Accordingly, making the first determination could involve determining that the communication session would be a real-time-data communication session (such as a voice-communication session). As another possibility, making the first determination could involve determining that the communication session would be a best-effort-data communication session (such as a text-communication session). Further still, making the first determination could involve determining that the communication session is (or is not) for communication a given sub-class of data (such as voice-communication data). Other variations are possible as well.

Making the first determination could involve making a second determination that the first RAN cannot establish the communication session. The second determination could involve a determination that the first RAN lacks sufficient resources to establish the communication session. As discussed above, such resources could be time slots, transmission power, and/or traffic channels, among other possibilities. For example, the first RAN might determine that allowing establishment of the communication session would require increasing the transmission power of the base station providing the coverage area to the mobile station to a level above (or below) an acceptable threshold. The second determination could also involve evaluating additional and/or different factors without departing from the scope of the claims.

As another possibility, the first determination could be a determination that the first RAN should not establish the communication session (even if the first RAN has sufficient resources to do so). For example, the first RAN may determine that the mobile station that is requesting establishment of the communication session is historically a high-data-usage mobile station. Because establishing the communication session may severely strain the resources available to other mobile stations, the first RAN may determine to proactively conserve available resources by not establishing the communication session.

At step 306, the RAN establishes the requested traffic channel after making the first determination. And at step 308, without establishing the communication session, the RAN redirects the mobile station via the established traffic channel to a second RAN different from the first. The RAN redirecting the mobile station could take the form of the RAN sending a handoff message instructing the mobile station to register and/or send the traffic-channel request to the second RAN, as examples.

The first and/or second RANs may establish communication sessions for only designated classes of data. This may be so because the range of frequencies used by a respective RAN for forward- and reverse-link communication may be more ideal for a given class of data while less ideal for another class. For example, higher frequencies generally allow for higher data throughput, while lower frequencies generally allow for greater distances between the mobile and base stations. Accordingly, the first RAN may operate in a higher-frequency band class and may be configured to establish communication sessions for only non-voice data (which tends to require higher data throughput) while the second RAN may operate in a lower-frequency band class and may be configured to establish communication sessions for voice-data only (which may help to prevent dropped voice calls but may allow for lower data throughput).

In one example, both the first and second RANs operate in the 1900 MHz band class and are designated to establish communication sessions for only non-voice data. The first RAN uses the faster CDMA EV-DO protocol, while the second RAN uses the slower CDMA 1xRTT protocol. Additionally, the RAN with which the mobile station most-recently registered operates according to the 1xRTT protocol in the 800 MHz band class. If the mobile station's request to establish a traffic channel for a high-bandwidth communication session is denied by the first RAN, then the mobile station will attempt to establish the traffic channel via the most-recent RAN. This may be undesirable if the second RAN has resources available to establish a traffic channel for a high-bandwidth communication session because the second RAN, though operating according to the same, slower 1xRTT protocol as the most-recent RAN, operates in a band class higher than that of the most-recent RAN and is thus able to provide a higher-bandwidth (and thus a faster) communication session.

By granting (rather than denying) the request to establish the traffic channel, the first RAN can redirect the mobile station to a second RAN selected by the first RAN (rather than the mobile station choosing a second RAN without reference to the PRL).

II. Example Architecture

Figure 4:
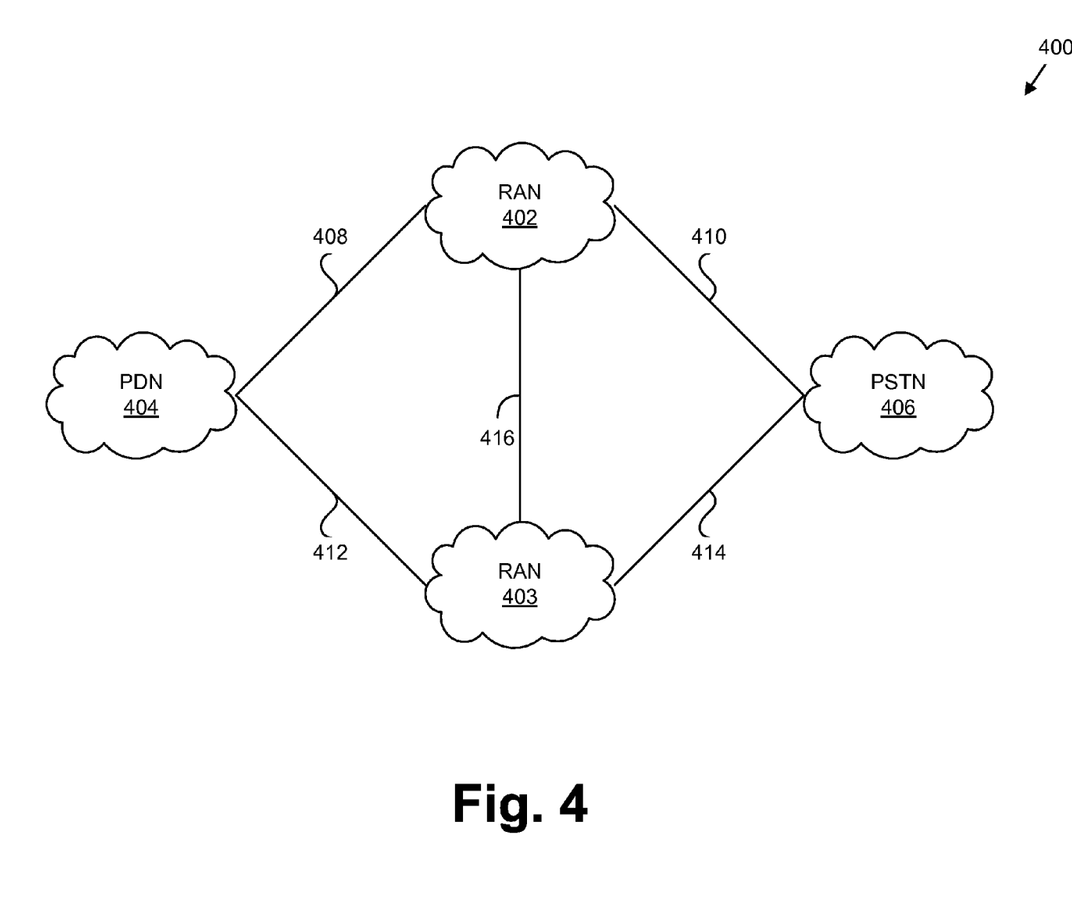
FIG. 4 depicts an example communication system.

FIG. 4 depicts a communication system 400 that includes RANs 402 and 403, a packet-data network (PDN) 404, and a public switched telephone network (PSTN) 406. RANs 402 and 403 communicate with PDN 404 via communication links 408 and 412, respectively, and with PSTN 406 via a communication links 410 and 414, respectively. Further, RANs 402 and 403 communicate via communication link 416. Any or all of these communications links may include one or more wired and/or wireless interfaces.

Figure 5:
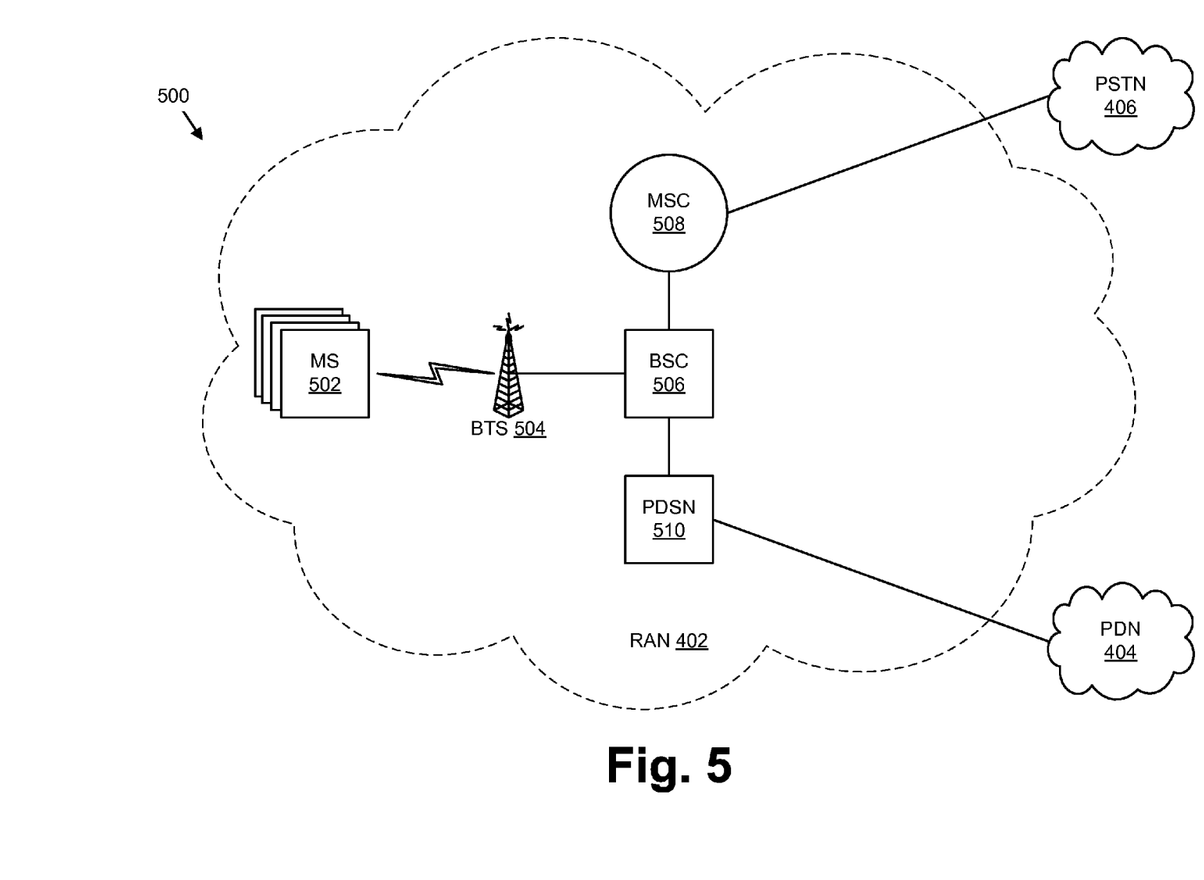
FIG. 5 depicts an example radio access network (RAN) in the context of the example communication system of FIG. 1.

FIG. 5 depicts communication system 400 with a more detailed depiction of RAN 402, which is shown in this example as including a plurality of mobile stations 502, a base transceiver station (BTS) 504, a base station controller (BSC) 506, a mobile switching center (MSC) 508, and a packet data serving node (PDSN) 510. Additional entities could also be present, such as additional mobile stations in communication with BTS 504, additional entities in communication with PDN 404 and/or PSTN 406, etc. Also, there could be one or more routers, switches, and/or other devices or networks making up at least part of one or more of the communication links. And other variations are possible as well.

An example mobile station is described below in connection with FIG. 6, while an example RAN entity is described below in connection with FIG. 7. The example mobile station could represent any one or more of the mobile stations 502, while the example RAN entity could represent any one or any combination of BTS 504, BSC 506, MSC 508, PDSN 510, one or more network servers, and/or one or more other devices and/or entities of any other type that are suitably arranged, programmed, and configured to, alone and/or in various combinations, carry out the functions described herein as being carried out by at least one RAN entity.

BTS 504 generally functions to provide one or more coverage areas on one or more carrier frequencies, and to interface between air-interface communications with mobile stations on the one hand and "backhaul" communications with BSC 506 on the other hand. BSC 506 generally functions to control one or more BTSs, and to provide one or more BTSs with connections to devices such as MSC 508 and PDSN 510. MSC 508 generally functions to connect BSCs to circuit-switched networks such as PSTN 406, and serves at least a telephone-switch function to facilitate such connections. PDSN 510 generally functions to connect BSCs to packet-switched networks such as PDN 404, which could be the Internet, and serves at least a network-access-server (NAS) function to facilitate such connections.

Figure 6:
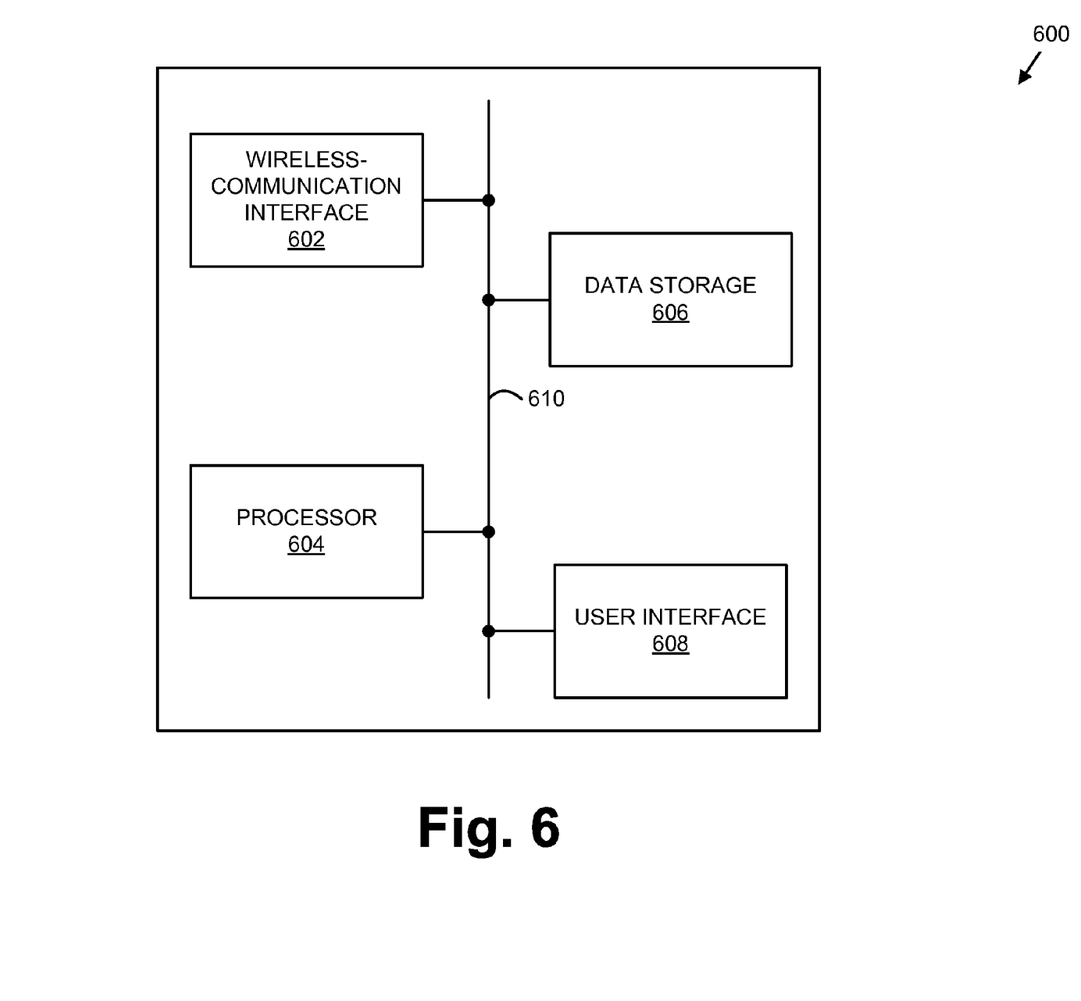
FIG. 6 depicts an example mobile station.

FIG. 6 depicts an example mobile station 600 as including a wireless-communication interface 602, a processor 604, data storage 606, and a user interface 608, all of which may be coupled together by a system bus, network, or other communication mechanism 610.

Wireless-communication interface 602 may comprise one or more antennae and one or more chipsets for communicating with one or more base stations over respective air interfaces. As an example, one such chipset could be one that is suitable for CDMA communication. The chipset or wireless-communication interface in general may also or instead be arranged to communicate according to one or more other types (e.g. protocols) mentioned herein and/or any others now known or later developed.

Processor 604 may comprise one or more general-purpose processors and/or one or more special-purpose processors, and may be integrated in whole or in part with wireless-communication interface 602. Data storage 606 may comprise one or more volatile and/or non-volatile storage components (such as magnetic, optical, flash, or other non-transitory storage) and may be integrated in whole or in part with processor 604. And certainly other configurations are possible. Data storage 606 may contain program instructions executable by processor 604 for carrying out various access-terminal functions described herein. User interface 608 may include one or more input devices such as a touchscreen, one or more buttons, a microphone, and the like for receiving inputs from users, as well as one or more output devices such a display, one or more indicator lights, a speaker, and the like for communicating outputs to users.

Figure 7:
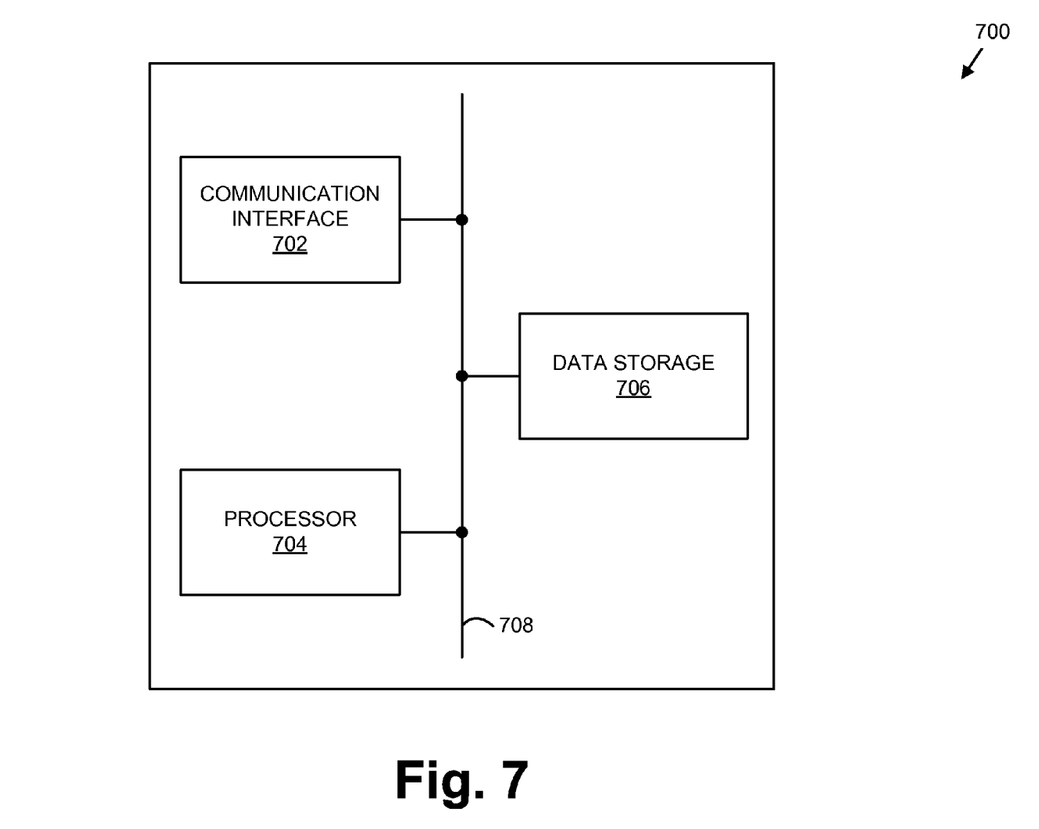
FIG. 7 depicts an example RAN entity.

FIG. 7 depicts an example RAN entity 700 as including a communication interface 702, a processor 704, and data storage 706, all of which may be coupled together by a system bus, network, or other communication mechanism 708. Communication interface 702 may include one or more interfaces (e.g., an Ethernet card) for engaging in wired communication and/or one or more interfaces (e.g., a Wi-Fi interface) for engaging in wireless communication. Processor 704 may comprise one or more general-purpose processors and/or one or more special-purpose processors, and may be integrated in whole or in part with communication interface 702. Data storage 706 may comprise one or more volatile and/or non-volatile storage components (such as magnetic, optical, flash, or other non-transitory storage) and may be integrated in whole or in part with processor 704. And certainly other configurations are possible. Data storage 706 may contain program instructions executable by processor 704 for carrying out various RAN-entity functions described herein. RAN entity 700 may also have a user interface and/or one or more other components deemed suitable for a particular context.

While some example embodiments have been described above, those of ordinary skill in the art will appreciate that numerous changes to the described embodiments could be made without departing from the scope and spirit of the claims.

The invention claimed is:

1. A method carried out by a first radio access network (RAN) comprising a processor and a data storage having stored thereon instructions executable by the processor for carrying out the method, which comprises:
   receiving, into the first RAN, a request from a mobile station to establish a traffic channel between the mobile station and the first RAN for use in a communication session;
   making a first determination, by the first RAN, to not establish the communication session;
   establishing, by the first RAN, the requested traffic channel after making the first determination; and
   without establishing the communication session, redirecting, by the first RAN, the mobile station via the established traffic channel to a second RAN different from the first RAN.

2. The method of claim 1, wherein the request to establish the traffic channel between the mobile station and the first RAN comprises a request to establish a traffic channel between the mobile station and a base station of the first RAN.

3. The method of claim 1, wherein the method is carried out by a base station of the first RAN.

4. The method of claim 1, wherein the first RAN operates in a first band class.

5. The method of claim 4, wherein the second RAN operates in the first band class.

6. The method of claim 1, wherein making the first determination comprises making a second determination that the first RAN cannot establish the communication session.

7. The method of claim 6, wherein making the second determination comprises determining that the first RAN lacks sufficient resources to establish the communication session.

8. The method of claim 1, wherein making the first determination comprises determining that the communication session would be for communicating data of a given class.

9. The method of claim 8, wherein the class comprises a voice class.

10. The method of claim 8, wherein the class comprises a non-voice class.

11. The method of claim 1, further comprising determining that the first RAN can establish the requested traffic channel.

12. A cellular-network entity selected from the group consisting of a base station, a base station controller, a radio network controller, a mobile switching center, and a packet data serving node, the cellular-network entity comprising:
   a processor; and
   data storage comprising instructions executable by the processor for causing the cellular-network entity to carry out a set of functions, wherein the set of functions includes:
   receiving a request from a mobile station to establish a traffic channel between the mobile station and a first radio access network (RAN) for use in a communication session;
   making a first determination to not establish the communication session;
   establishing the requested traffic channel after making the first determination; and
   without establishing the communication session, redirecting the mobile station via the established traffic channel to a second RAN different from the first.

13. The cellular-network entity of claim 12, wherein the request to establish the traffic channel between the mobile station and the first RAN comprises a request to establish a traffic channel between the mobile station and a first RAN entity of the first RAN.

14. The cellular-network entity of claim 13, wherein the first RAN entity of the first RAN is a base station of the first RAN.

15. The cellular-network entity of claim 12, wherein the first RAN operates in a first band class.

16. The cellular-network entity of claim 12, wherein making the first determination comprises making a second determination that the first RAN cannot establish the communication session.

17. The cellular-network entity of claim 16, wherein making the second determination comprises determining that the first RAN lacks sufficient resources to establish the communication session.

18. The cellular-network entity of claim 12, wherein making the first determination comprises determining that the communication session would be for communicating data of a given class.

19. The cellular-network entity of claim 18, wherein the class comprises a voice class.

20. The cellular-network entity of claim 18, wherein the class comprises a non-voice class.

* * * * *